United States Patent [19]
Lee

[11] Patent Number: 5,634,160
[45] Date of Patent: May 27, 1997

[54] CAMERA FILM WINDING SYSTEM

[75] Inventor: Yang-jik Lee, Kyeongsangnam-do, Rep. of Korea

[73] Assignee: Samsung Aerospace Industries, Ltd., Kyeongsangnam-do, Rep. of Korea

[21] Appl. No.: 601,699

[22] Filed: Feb. 15, 1996

Related U.S. Application Data

[63] Continuation of Ser. No. 253,569, Jun. 3, 1994, abandoned.

[30] Foreign Application Priority Data

Nov. 11, 1993 [KR] Rep. of Korea ............... 93.23914

[51] Int. Cl.⁶ .................................................. G03B 1/00
[52] U.S. Cl. .......................................... 396/395; 396/412
[58] Field of Search .................................... 354/206, 288, 354/171, 172; 396/387, 395, 401, 412

[56] References Cited

U.S. PATENT DOCUMENTS

| | | | |
|---|---|---|---|
| 2,169,548 | 8/1939 | Zapp | 354/172 |
| 3,036,507 | 5/1962 | Losseu | 354/172 |
| 3,232,196 | 2/1966 | Sapp, Jr. et al. | 354/172 |
| 4,226,517 | 10/1980 | Skarman | 354/75 |
| 4,268,150 | 5/1981 | Chen | 354/206 |
| 4,351,595 | 9/1982 | Date et al. | 354/173 |
| 5,300,975 | 4/1994 | Kunishige | 354/173.11 |

*Primary Examiner*—Safet Metjahic
*Assistant Examiner*—Nicholas J. Tuccillo
*Attorney, Agent, or Firm*—Finnegan, Henderson, Farabow, Garrett & Dunner, L.L.P.

[57] ABSTRACT

A film winding system for a disposable camera. The system includes a spring coupled to rotate a film spool through a spool gear, a sprocket engaged with holes in the film, a cam on a common axis with the sprocket, and a mechanism for engaging the spool drive gears to stop the rotation of the spool after the film has advanced one frame.

17 Claims, 3 Drawing Sheets

CAMERA FILM WINDING SYSTEM

This application is a continuation of application Ser. No. 08/253,569, filed Jun. 3, 1994, now abandoned.

BACKGROUND OF THE INVENTION

1. Field of the invention

The present invention relates generally to a camera film winding system and, more particularly, to a film winding system for a disposable camera that automatically advances the film by one frame immediately after completion of a photograph.

2. Description of Related Art

Disposable cameras have recently become popular, with many people preferring a disposable camera to a reusable camera for travel and outings.

The typical disposable camera includes a plastic body containing a shutter system and a film advancing system. The typical disposable camera has the disadvantage that the camera can be inconvenient to use, because a winding knob of the film advancing system must be manually operated to advance the film after each photograph. This manual operation makes it impossible to quickly and repeatedly photograph a transient image.

SUMMARY OF THE INVENTION

It is an object of the present invention to provide a disposable camera capable of quickly and repeatedly photographing a transient image.

To achieve this and other objects of the present invention, the camera system of the present invention, as embodied and broadly defined herein, has a film integral therein. The system includes a winding means for automatically advancing the film by one frame after each photograph is taken, and a release means for enabling the operation of a shutter substantially simultaneously with the advancing of the film.

The accompanying drawings, which are incorporated in and which constitute a part of this specification, illustrate one embodiment of the invention and, together with the description, explain the principles of the invention.

DETAILED DESCRIPTION OF THE PREFERRED EMBODIMENTS

Figure 1:
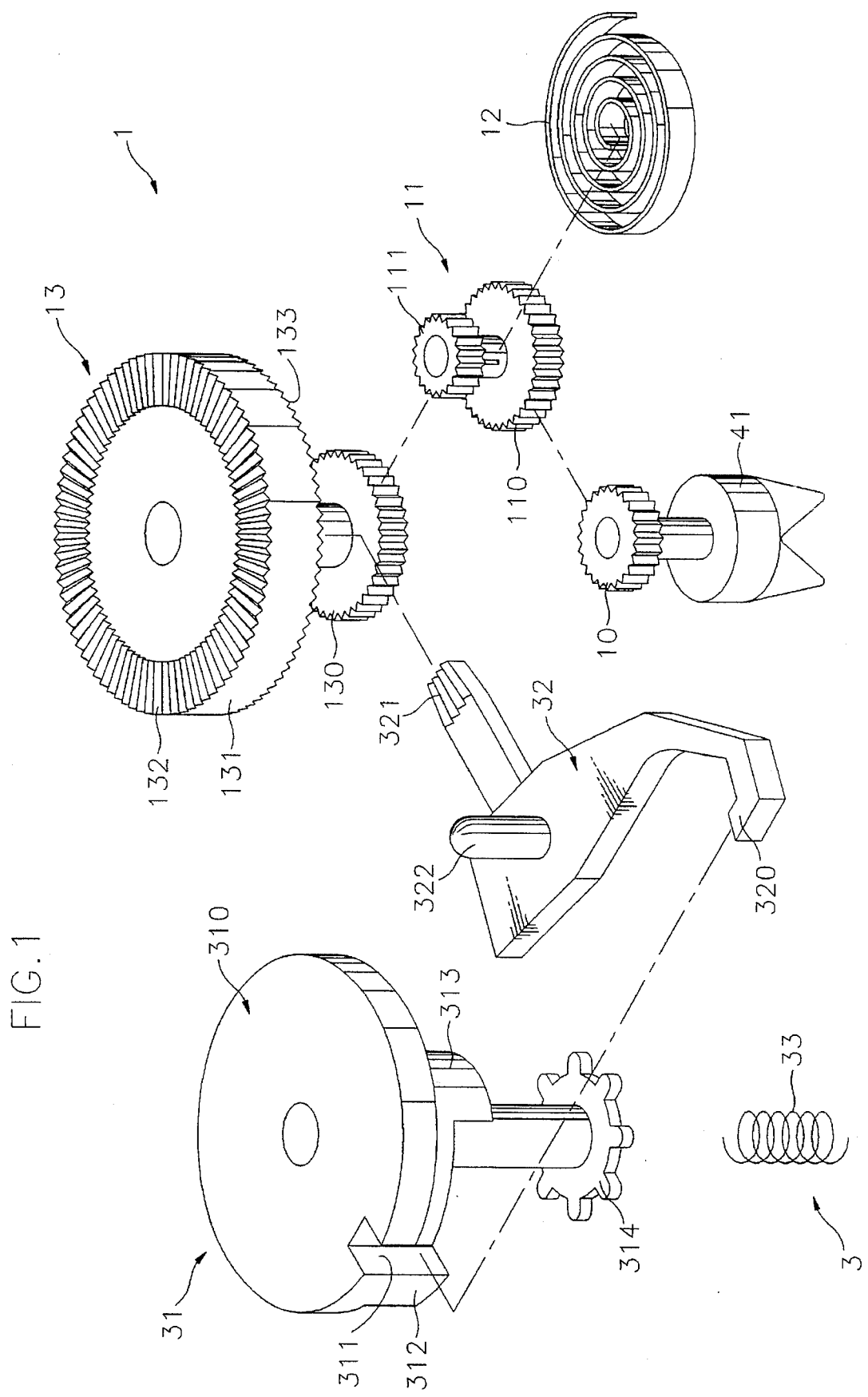
FIG. 1 is an exploded perspective view showing a film winding system in accordance with the preferred embodiment of the present invention.

The following is a description of the preferred embodiments of the invention. Corresponding reference numbers will be used throughout the drawing to refer to the same or like parts.

Figure 2:
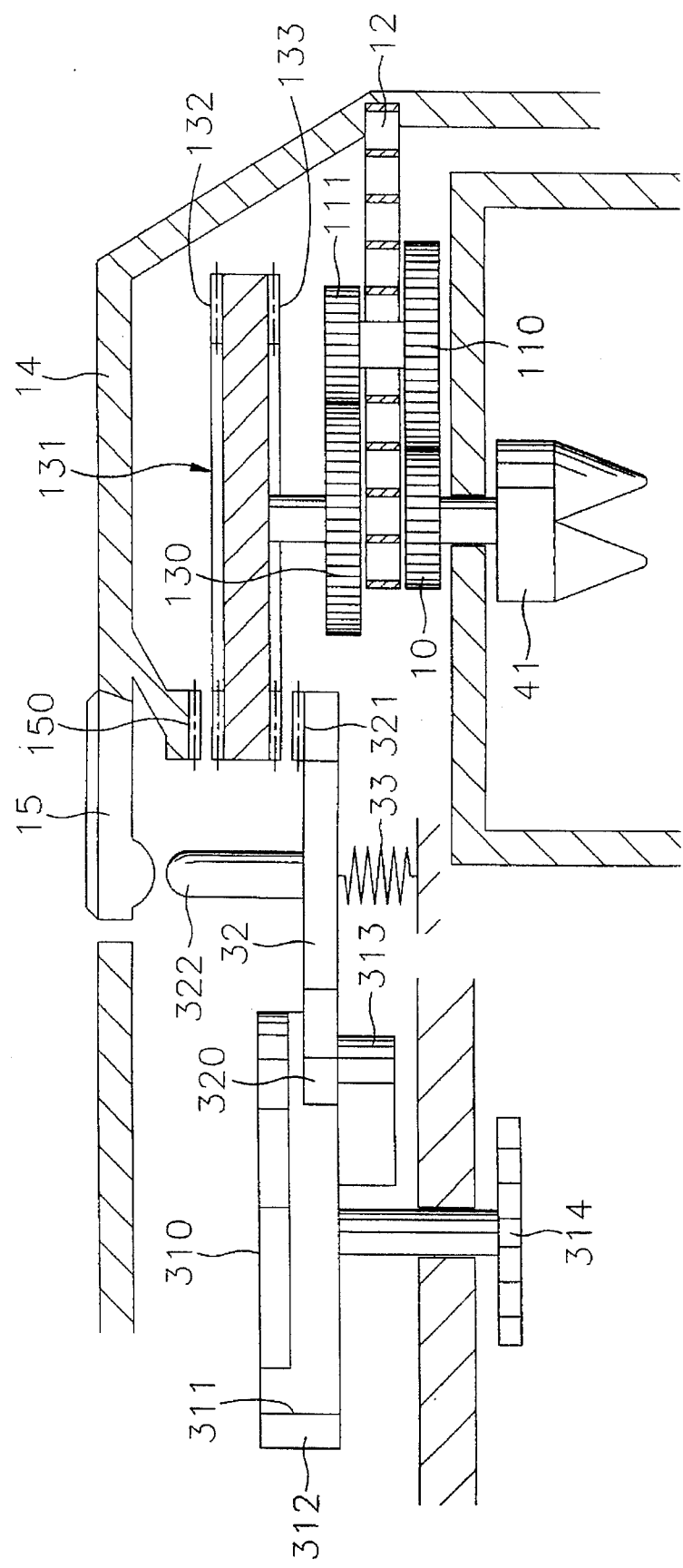
FIG. 2 is a partial sectional view of the film winding system in accordance with the preferred winding system.

FIGS. 1 and 2 show a film winding system according to a preferred embodiment of the present invention. The preferred winding system includes a winding part 1 and a winding control part 3 for controlling the winding part 1.

The winding part 1 includes a film spool gear 10, a conversion gear 11, engaged with the spool gear 10 to deliver power, and a mechanical spring 12 connected to the conversion gear 11 to generate a rotation power. The spool gear 10 is coupled to film spool engagement member 41, which rotates the take-up film spool (not shown). A winding control member 13 engages with the conversion gear 11 to limit a rotation of the conversion gear 11.

The conversion gear 11 includes a relatively large gear 110 and a relatively small gear 111, arranged on a common axis. The winding control member 13 includes a winding control plate 131 and a gear 130, arranged on a common axis.

The relatively large gear 110 meshes with the spool gear 10, and the relatively small gear 111 meshes with the gear 130 of the winding control member 13, allowing the spool gear 10 to be rotated by a small rotation force of the relatively small gear 111, to realize an efficient winding operation.

The mechanical spring 12 is fixedly mounted at one end on the conversion gear 11 and at another end on a camera body 14. The mechanical spring 12 maintains its elastic force at least until the last frame of the film is advanced.

The camera body 14 includes a release button 15 and a shutter elastic projection 150 that cooperates with the release button 15 (see FIG. 2).

The winding control plate 131 includes gear teeth 132 on its upper side edge. The gear teeth 132 selectively mesh with the shutter elastic projection 150 to prevent the film from advancing when the release button 15 operates. The winding control plate 131 further includes gear teeth 133 on its lower side edge to control an advancing amount of the film by one frame.

The winding control part 3 comprises a film advance guide member 31, a shutter operation member 32 for operating a shutter, and an elastic member 33 for elastically supporting the shutter operation member 32. Elastic member 33 includes a spring.

The film advance guide member 31 includes a sprocket 314 for guiding the advancement of the film and a control cam 310 having a control groove 311 and a cam portion 313. The sprocket 314 and the control cam 310 are arranged on a common axis. The shutter operation member 32 has a hook projection 320 contacting the cam portion 313 and selectively hooked to the control groove 311, a gear projection 321 selectively meshed with the gear teeth 133 of the winding control plate 131, and an operating projection 322 contacting the release button 15 during the operation of the release button 15. The elastic member 33 supports the shutter operation member 32 to provide a rotating elastic force toward the cam portion 313. Thus, the film is advanced by one frame after the operation of the shutter by the release button 15.

The film advance guide member 31 further includes a control projection 312 having a side common with a side of the groove 311 to precisely control the hook projection 320 of the shutter operation member 32 when the one frame of the film is advanced.

Figure 3A:
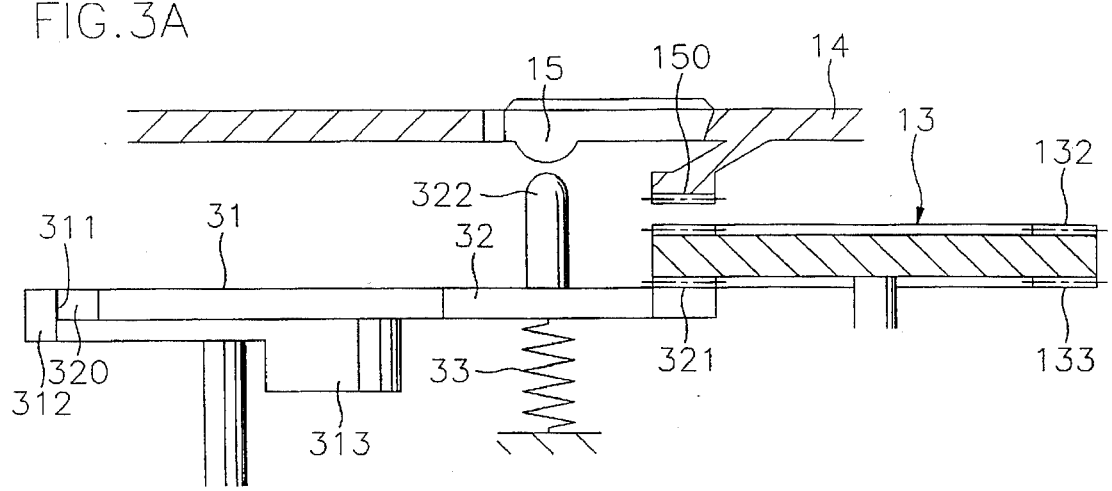
FIG. 3A is a view illustrating an initial operation state of the film winding system.
Figure 3B:
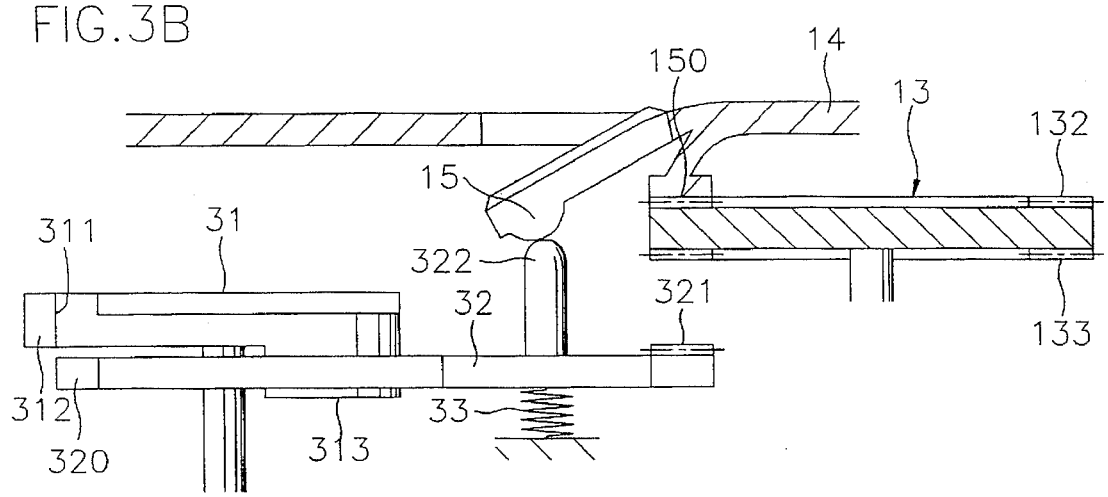
FIG. 3B is a view illustrating a shutter operation state of the film winding system.
Figure 3C:
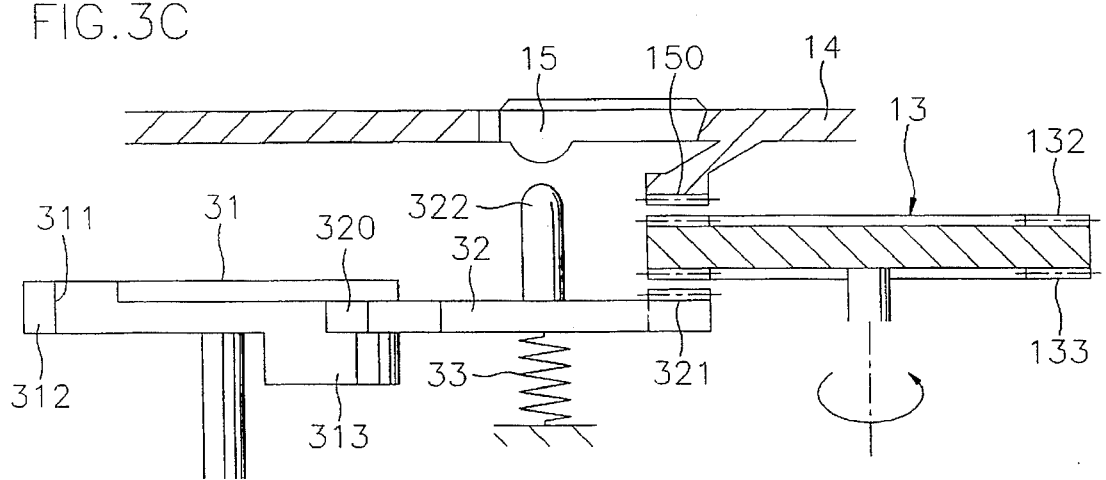
FIG. 3C is a view illustrating an winding operation state of the film winding system.

FIGS. 3A, 3B and 3C show an operation of the film winding system. Pushing the release button 15 to take a picture in a state of FIG. 3A, as shown in FIG. 2, pushes the operation projection 322, which meshes the elastic projection 150 inside of the release button 15 with the gear portion 132 of the winding control plate 131, which separates the gear projection 321 from the gear portion 133 of the winding control plate 131. At this time the elastic projection 150 locks the winding control plate 131 to prevent the winding part 1 from operating.

In this state, further pushing the release button, the winding part 1 continues to be inoperative and the shutter operation member 32 overcomes the elastic force of the elastic member 33 to descend. As shown in FIG. 3(B), this descent causes the hook projection 320 to separate from the groove 311 of the control cam 31 to descend along the cam portion 313 to actuate the shutter (not shown) cooperating with the shutter operation member 32 to take the photograph.

Subsequently, releasing the release button 15 disengages the elastic projection 150 from gear teeth 132 of the winding control plate 131 as shown in FIG. 3C, rotating conversion gear 11 by the elastic force of the spring 12, rotating the winding control plate 131. The spool gear 10, meshed with the large gear 110, rotates, advancing the film, rotating the sprocket 314, inserted into the holes on the periphery of the film, to precisely guide the film, and rotate the control cam 31. The control cam 31 then rotates, stopping the hook projection 320 closely contacting the cam portion 311 by the projection 312 provided for precisely controlling the amount of advancement of the film and concurrently ascended and inserted into the control groove 311 by the biasing force of the elastic member 33. Accordingly, the shutter operation member 32 overcomes the rotating elastic force of the elastic member 33 as the cam portion 313 rotates, whereby the shutter operation member 32 reverts to the initial state by the biasing force of the elastic member 33 as shown in FIG. 3A.

Accordingly, as shown in FIG. 3A, the gear projection 321 of the shutter operation member 32 selectively meshes with the gear portion 133 to control the winding state of the winding part 1, such that the next photograph is prepared.

In summary, the winding control part comprises a spool gear for winding the film, a conversion gear connected to the spool gear to transmit a driving force, a winding member mounted on the conversion gear to generate a rotating force, and a winding control plate meshed with the conversion gear to suppress a rotation.

The winding member comprises a mechanical spring having opposite ends respectively fixed to the conversion gear and the camera body.

The conversion gear comprises a relatively large gear meshed with the spool gear to effectively realize the rotation of the winding control plate with a small rotation force and to reduce volume of the winding member, and a relatively small gear meshed with a gear formed on an axis of the winding control plate to generate a pertinent rotation ratio.

The winding control plate comprises a first gear portion selectively meshed with an elastic projection of the release button to prevent an advancement of the film during the operation of the shutter and a second gear portion, the first and second gear portions being respectively formed on periphery of upper and lower sides of the winding control plate to control the advancement of the film by one frame by the winding control part.

The winding control part comprises a control cam for guiding the advancement of the film, the control cam having a cam portion, a control groove and a sprocket mounted on an axis of the control cam, and a shutter operation member including a hook projection that closely contacts the cam portion of the cam and is selectively hooked on the control groove, a gear projection that is selectively meshed with the second gear portion of the winding control plate, and an operation projection selectively contacting the release button.

The control cam further comprises a control projection having a same plane as one side of the control groove to precisely control the hook control projection of the shutter operation member when the one frame of the film is advanced.

As described above, the film winding system for a film-charged type camera of the present invention automatically advances the film by one frame immediately after completion of each photograph and precisely controls the amount of the advancement of the film such that it is easy to use the camera and it is possible to promptly repeatedly photograph a transient scene. The system includes a spring coupled to rotate a film spool through a spool gear, a sprocket engaged with holes in the film, a cam on a common axis with the sprocket, and a mechanism for engaging the spool drive gears to stop the rotation of the spool after the film has advanced one frame.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the appended claims.

What is claimed is:

1. A camera system having an integral film. comprising:
    a shutter release mechanism operable when depressed to expose the film, the shutter release mechanism including a projection;
    a winding means for automatically advancing the film by one frame after each photograph is taken; and
    a control means, coupled to the winding means, for controlling the advancement of the film, said control means comprising a control cam for guiding the advancement of the film and having a control groove, said control means further comprising a shutter operation member having a hook projection normally engaging the control groove of the control cam to prevent the film from advancing, the shutter operation member further having a gear projection normally engaging the winding means;
    wherein the projection of said shutter release mechanism selectively engages said winding means to prevent said winding means from advancing the film when said shutter release mechanism is depressed, and allows said winding means to advance the film when said shutter release mechanism is released; and
    wherein said shutter release mechanism biases the hook projection of the shutter operation member to disengage the control groove of the control cam when said shutter release mechanism is depressed, and allows the hook projection to reengage the control groove after said winding means has advanced the film one frame when said shutter release mechanism is released.

2. The system of claim 1 wherein the control cam includes a control projection on a plane corresponding to a side plane of the control groove to control the movement of the hook projection when the film is advanced.

3. The system of claim 1, wherein the means for biasing comprises a spring.

4. The camera system of claim 1, wherein the gear projection of the shutter operation member normally engages the winding means to maintain the engagement of the hook projection of the shutter operation member with the control groove of the control cam.

5. The camera system of claim 1, wherein the shutter operation member of said control means further includes an operation projection contacting said shutter release mechanism when said shutter release mechanism is depressed.

6. The camera system of claim 5, wherein the depression of said shutter release mechanism contacts the operation projection of the shutter operation member to cause the hook projection of the shutter operation member to disengage the control groove of the control cam.

7. The system of claim 1, wherein said control means includes:

a spool gear for winding the film; and a conversion gear, coupled to the spool gear, to provide a driving force to the spool gear, wherein said conversion gear includes a winding member to provide a rotational force to the conversion gear and a winding control plate engaged with the conversion gear to suppress a rotation of the winding control plate.

8. The system of claim 7, wherein said winding member includes a spring mechanically coupled to the conversion gear and the body of the camera system on opposite ends.

9. The system of claim 7, wherein the conversion gear includes a relatively large gear engaged with the spool gear to effectuate the rotation of the winding control plate with a small rotational force, and a relatively small gear engaged with an axis of the winding control plate to provide a desired rotation ratio.

10. The system of claim 7, wherein the winding control plate includes a first gear member at least partially engaged the projection to prevent the advancing of the film during the depression of the shutter release mechanism and a second gear member, the first and second gear members on the periphery of opposite sides of the winding control plate to control the advancing of the film.

11. A camera having an integral film, comprising:

a shutter release mechanism operable when actuated to expose the film;

a spool for receiving exposed film, the spool being mechanically biased to receive the exposed film;

a control plate mechanically connected to the spool, the shutter release mechanism engaging the control plate while the shutter release is actuated to prevent the spool from receiving the exposed film;

a shutter operation member biased by the shutter release mechanism when the shutter release mechanism is actuated, the shutter operation member normally engaging the control plate to prevent the spool from receiving the exposed film, and the shutter operation member disengaging the control plate when the shutter release mechanism is actuated.

12. The camera of claim 11, further comprising a spring biasing the spool.

13. The camera of claim 12, wherein the control plate is a circular disk having first and second gears, the first gears engaging the shutter release mechanism and the second gears engaging the shutter operation member.

14. The camera of claim 13, further comprising a cam and a hook connected to the shutter operation member, the hook normally engaging the cam and disengaging from the cam when the shutter release mechanism is actuated.

15. The camera of claim 14, further comprising a sprocket having teeth for engaging holes in the exposed film, the sprocket being connected to the cam so as to rotate the cam as the spool receives the exposed film, wherein the spool receives one frame of exposed film before the hook reengages the cam.

16. The camera of claim 15, wherein the shutter operation member comprises a projection having gears for engaging the second gears of the control plate.

17. A camera system having an integral film, comprising:

winding means for automatically advancing the film by one frame after each photograph is taken;

a shutter release mechanism operable when depressed to expose the film, said shutter release mechanism engaging the winding means to prevent the film from advancing when depressed; and a shutter operation member normally engaged to the winding means to prevent the film from advancing, said shutter operation member disengaging the winding means when said shutter release mechanism is depressed.

* * * * *

UNITED STATES PATENT AND TRADEMARK OFFICE
CERTIFICATE OF CORRECTION

PATENT NO. : 5,634,160
DATED : May 27, 1997
INVENTOR(S) : Yang-jik LEE

It is certified that error appears in the above-indentified patent and that said Letters Patent is hereby corrected as shown below:

Claim 1, column 4, line 25, "film." should read --film,--.

Claim 10, column 5, line 27, after "engaged", insert --with--.

Signed and Sealed this

Ninth Day of December, 1997

*Attest:*

BRUCE LEHMAN

*Attesting Officer*     *Commissioner of Patents and Trademarks*